(12) United States Patent
Do et al.

(10) Patent No.: US 10,247,036 B2
(45) Date of Patent: Apr. 2, 2019

(54) PRESSURE FED OIL DRAIN FOR GAS TURBINE ENGINE SUMP

(71) Applicant: General Electric Company, Schenectady, NY (US)

(72) Inventors: Kevin Michael Do, Cincinnati, OH (US); Keith Lloyd Jones, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 610 days.

(21) Appl. No.: 14/651,702

(22) PCT Filed: Dec. 10, 2013

(86) PCT No.: PCT/US2013/074019
§ 371 (c)(1),
(2) Date: Jun. 12, 2015

(87) PCT Pub. No.: WO2014/093286
PCT Pub. Date: Jun. 19, 2014

(65) Prior Publication Data
US 2015/0315933 A1    Nov. 5, 2015

Related U.S. Application Data

(60) Provisional application No. 61/737,396, filed on Dec. 14, 2012.

(51) Int. Cl.
*F01D 25/18* (2006.01)
*F01M 11/06* (2006.01)
(Continued)

(52) U.S. Cl.
CPC ............ *F01D 25/18* (2013.01); *F01D 25/32* (2013.01); *F01M 11/065* (2013.01); *F16N 31/00* (2013.01); *Y02T 50/671* (2013.01)

(58) Field of Classification Search
CPC ....... F01D 25/18; F01D 25/32; F01M 11/065; F16N 31/00; Y02T 50/671
(Continued)

(56) References Cited

U.S. PATENT DOCUMENTS 2,874,803 A * 2/1959 Gunberg ................. F01D 25/18
184/6.11
2,934,168 A * 4/1960 Klompas ................. F01D 25/18
184/6.26
(Continued)

FOREIGN PATENT DOCUMENTS

CN    101008350 A    8/2007
EP      1936123 A2    6/2008
(Continued)

OTHER PUBLICATIONS

International Search Report and Written Opinion dated Apr. 3, 2014 which was issued in connection with PCT Patent Application No. PCT/US13/074019 which was filed on Dec. 10, 2013.
(Continued)

*Primary Examiner* — William McCalister
(74) *Attorney, Agent, or Firm* — General Electric Company; Pamela Kachur (57) ABSTRACT

A pressure fed oil drain for gas turbine engine (10) includes an oil sump (48) and a passage (60, 63) in selective flow communication with the oil sump (48), the passage in flow communication with a drain (62), the passage being pressurized and creating a differential between the passage and ambient atmosphere (65), the drain is disposed at an elevation beneath a passage feature (64) when the turbine engine is disposed at an extreme attitude angle, the passage (63) extending upwardly when in the extreme attitude angle.

16 Claims, 9 Drawing Sheets

(51) Int. Cl.
*F16N 31/00* (2006.01)
*F01D 25/32* (2006.01)

(58) Field of Classification Search
USPC .......... 60/39.08; 415/111, 112, 168.2, 168.4; 277/304, 305, 423
See application file for complete search history.

(56) References Cited

U.S. PATENT DOCUMENTS

| | | | |
|---|---|---|---|
| 4,344,506 A | 8/1982 | Smith | |
| 4,531,358 A | 7/1985 | Smith | |
| 4,576,001 A | 3/1986 | Smith | |
| 4,631,009 A | 12/1986 | Cygnor et al. | |
| 4,683,714 A * | 8/1987 | Thebert | F01D 25/18 184/6.11 |
| 4,856,273 A | 8/1989 | Murray | |
| 6,330,790 B1 * | 12/2001 | Arora | F01D 11/04 277/303 |
| 6,565,095 B2 | 5/2003 | Meacham | |
| 6,996,968 B2 * | 2/2006 | Peters | F01D 25/18 60/39.08 |
| 7,334,982 B2 * | 2/2008 | Singh | F01D 25/183 415/111 |
| 7,878,303 B2 * | 2/2011 | Munson | F01D 25/183 184/11.2 |
| 8,210,316 B2 * | 7/2012 | DiBenedetto | F01D 9/065 184/6.11 |
| 2007/0157596 A1 | 7/2007 | Moniz | |
| 2009/0250296 A1 | 10/2009 | Hannaford et al. | |
| 2010/0196140 A1 * | 8/2010 | Gee | F01D 25/183 415/111 |
| 2012/0027569 A1 * | 2/2012 | Purdey | F01D 11/00 415/1 |
| 2014/0003912 A1 * | 1/2014 | Knaack | F01D 25/162 415/122.1 |
| 2014/0182972 A1 * | 7/2014 | Hetherington | F02C 7/06 184/6.11 |
| 2015/0315933 A1 * | 11/2015 | Do | F01D 25/18 415/112 |

FOREIGN PATENT DOCUMENTS

| | | |
|---|---|---|
| JP | 5786527 A | 5/1982 |
| JP | 6140429 A | 2/1986 |
| JP | S61142140 U | 6/1986 |
| JP | S61142140 U | 9/1986 |
| JP | 62298625 A | 12/1987 |
| JP | H1077857 A | 3/1998 |

OTHER PUBLICATIONS

Unofficial English Translation of Chinese Office Action issued in connection with corresponding CN Application No. 201380073073.7 dated Feb. 4, 2017.

Unofficial English translation of Office Action issued in connection with corresponding JP Application No. 2015-547459 dated Apr. 26, 2016.

* cited by examiner

PRESSURE FED OIL DRAIN FOR GAS TURBINE ENGINE SUMP

CROSS-REFERENCE TO RELATED APPLICATIONS

This application claims priority under 35 U.S.C. § 119(e) of U.S. Provisional Patent Application No. 61/737,396 filed Dec. 14, 2012, in the name of the present inventors and entitled, "Pressure Fed Oil Drain for Gas Turbine Engine Sump", this provisional application being incorporated herein by reference.

BACKGROUND

The disclosed embodiments generally pertain to gas turbine engines. More particularly, but not by way of limitation, present embodiments relate to drains for gas turbine engine sumps.

In a gas turbine engine a typical gas turbine engine generally possesses a forward end and an aft end with its several core or propulsion components following axially therebetween. An air inlet or intake is at a forward end of the engine. Moving toward the aft end, in order, the intake is followed by a compressor, a combustion chamber, a turbine, and a nozzle at the aft end of the engine. It will be readily apparent from those skilled in the art that additional components may also be included in the engine, such as, for example, low-pressure and high-pressure compressors, and high-pressure and low-pressure turbines. This, however, is not an exhaustive list. An engine also typically has an internal shaft axially disposed along a center longitudinal axis of the engine. The internal shaft is connected to both the turbine and the air compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy.

In known turbine engines, the rotor shaft is typically supported for rotation by utilizing aft bearing assemblies. These bearing assemblies are lubricated and cooled through the use of separate oil sump systems.

It is always desirable to decrease the weight of a gas turbine engine utilized in the aviation industry. Such weight reduction results in higher efficiency of the engine and improved efficiency save cost for operators. It is also desirable to decrease the number of parts in a turbine engine which improves manufacturability and also improves the efficiency aspects previously noted. Certain engine designs have reduced engine weight by removing frame members or strut features. However, while meeting the goal of weight reduction, the changes also affect oil routing through the engine.

More specifically, extreme attitude angle or position, for example nose up condition, can affect the flow of oil through what are otherwise gravity drains. Longer axially extending runs of oil ducting may become problematic. In failure condition of a bearing sump seal, drains provide movement and removal of oil from a bearing sump. If a failure occurs and a plane is at an extreme attitude position, portions of the drain pathway may require movement of oil vertically through a path, tubing or fittings. When oil cannot move upwardly due to the vertical elevation, the oil may overflow into areas of higher temperature causing fire or coking components of the turbine engine.

As may be seen by the foregoing, it would be desirable to overcome these and other deficiencies with gas turbine engines.

SUMMARY

According to at least some embodiments, an oil sump drain is provided which utilizes pressurized air to force oil through a passage.

According to at least some embodiments, the pressurized air forces oil through an upward elevation change when an aircraft engine is in a nose-up attitude condition.

According to still other embodiments, a feature is utilized in a passage to crate an oil pool at a drain, allowing the pressurized air to force the oil through the drain and upward elevation change.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

Embodiments of the invention are illustrated in the following illustrations.

DETAILED DESCRIPTION

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-9, various embodiments of a pressure fed oil drain for a gas turbine engine are shown and described. The drain and path for oil are formed to create pooling of oil to completely submerge a drain. Due to this complete submergence, the pressurized air within the pathway causes oil to flow through the drain and upwardly in elevation through the path, ducting, piping or the like downstream of the drain to atmosphere.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine exhaust nozzle, or a component being relatively closer to the engine exhaust nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

Figure 1:
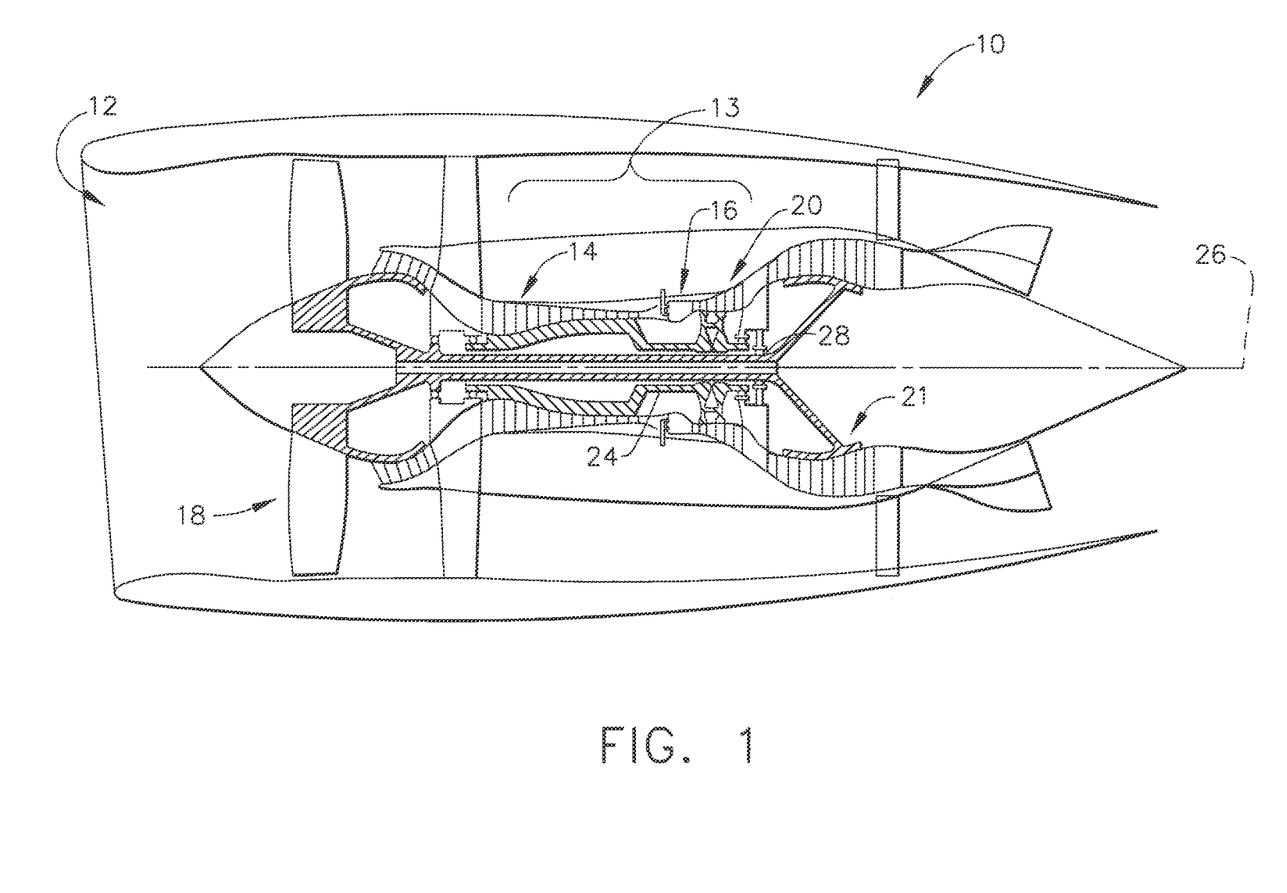
FIG. 1 is a side section view of a gas turbine engine.

Referring initially to FIG. 1, a schematic side section view of a gas turbine engine 10 is shown having an engine inlet end 12 wherein air enters the propulsor 13 which is defined generally by a compressor 14, a combustor 16 and a multi-stage high pressure turbine 20. Collectively, the propulsor 13 provides thrust or power during operation. The gas turbine 10 may be used for aviation, power generation, industrial, marine or the like.

In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. A low pressure turbine 21 may also be utilized to extract further energy and power additional compressor stages. The low pressure air may be used to aid in cooling components of the engine as well.

The gas turbine 10 is axis-symmetrical about engine axis 26 or shaft 24 so that various engine components rotate thereabout. The axis-symmetrical shaft 24 extends through the turbine engine forward end into an aft end and is journaled by bearings along the length of the shaft structure for rotation about a centerline 26 of the engine 10. The shaft 24 may be hollow to allow rotation of a low pressure turbine shaft 28 therein and independent of the shaft 24 rotation. The shaft 28 may also rotate about the centerline axis 26 of the engine. During operation the shaft rotates along with other structures connected to the shaft such as the rotor assemblies of the turbine in order to create power or thrust for various types of turbines used in power and industrial or aviation areas of use. The shaft 24 is supported by these bearings which operate in oil sumps to cool parts during the high speed revolution.

Figure 2:
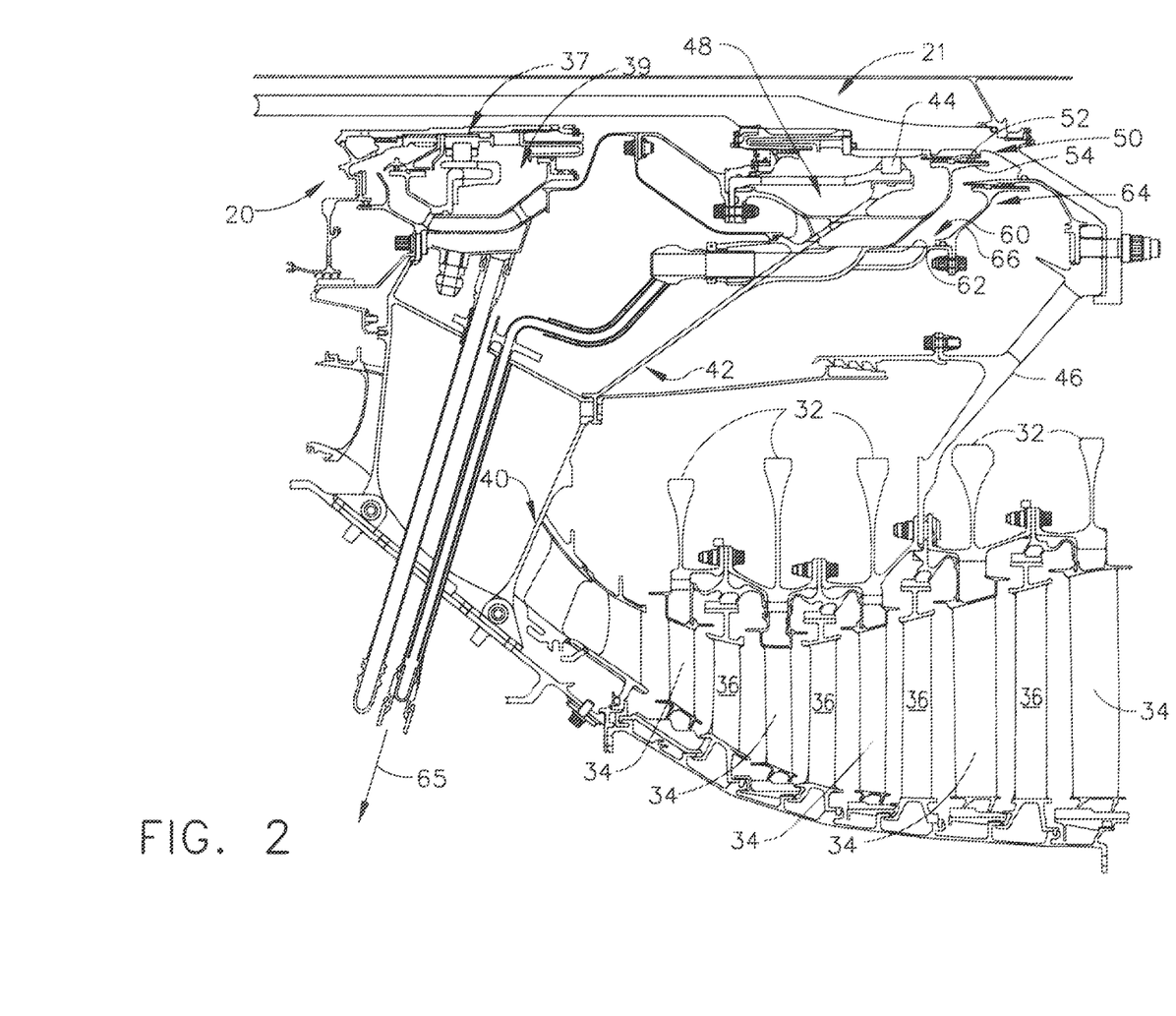
FIG. 2 is an side section view of a low pressure turbine (LPT)

Referring now to FIG. 2, a side section view of the engine turbine is depicted near a joint between the high pressure turbine 20 and the low pressure turbine 21. Adjacent the forward end of the low pressure turbine 21 is a turbine center frame or turbine mid-frame 40. A sump housing assembly 42 is located aft of the turbine center frame 40. The sump assembly 42 extends diagonally upwardly in the aft direction, in the view depicted, from the center frame 40.

The high pressure turbine 20 is shown having a bearing 37 and a corresponding bearing sump 39. The bearing 37 provides for rotation of the high pressure shaft 24 (FIG. 1) and cooling of the bearing 37 respectively.

The low pressure turbine 21 includes a plurality of discs 32 upon which are rotating airfoils 34. Between the airfoils are stationary stators 36. The discs 32 and airfoils 34 rotate with the low pressure shaft 46. The airfoils 34 extract energy from the combustion gas while the stationary stators 36 turn the combustion gas to maximize extraction of energy at each subsequent airfoil 34.

A bearing 44 for the low pressure turbine 21 is shown above the low pressure turbine discs 32 near an upper end of the sump assembly 42. The bearing allows rotation of the low pressure shaft 46 during operation of the engine 10. The bearing 44 operates within an oil sump 48 to provide cooling lubrication to the bearing 44.

As described previously, the removal of turbine rear frame members or struts of the exemplary turbine engine results in the sump 48 cone extending forward to make a support connection to the turbine center frame 40. As a result, forwardly directed passages for oil passage are longer in length to move oil forward to exit frame struts 40. As will be explained further, the longer horizontal run when the engine is at an extreme nose up attitude position and is one reason for development of the embodiments described herein.

The oil sump 48 includes an oil seal assembly 50 having a rotating seal 52 and a stationary seal 54. During failure of the seal 50 or overflow condition of the sump 48, some oil may pass through the oil seal assembly 50, opposite of its intended function, and move into a passage 60. The passage 60 has a drain 62 near a lower end thereof and the view depicted. The passage 60 and drain 62 are in flow communication with ducting or other passage ways which extend out of the engine through frame struts 40, and to atmosphere. The passage 60, drain 62 and downstream passage 63 are in flow communication with fitting 70.

A feature 64 is also located in the passage 60 downstream of the oil seal assembly 50. The feature 64 in the exemplary instant embodiment is an air seal with a rotating seal and a stationary seal. However, other features may be utilized with differing functions. The feature 64 of the instant embodiment inhibits leakage of the cooling air passing about the bearing oil sump 48 from mixing with the hot air moving through the turbine. The seal 64 also inhibits oil from passing through to the turbine side of the engine and catching fire. The feature 64 also inhibits back flow of oil during failure or overflow condition within passage 60 so that oil pools at the drain 62. As described further, when the oil pools at drain 62 the pressure differential may be utilized to force the oil to move upwardly through drain passage 63 when the aircraft is in an extreme nose-up condition.

Figure 3:
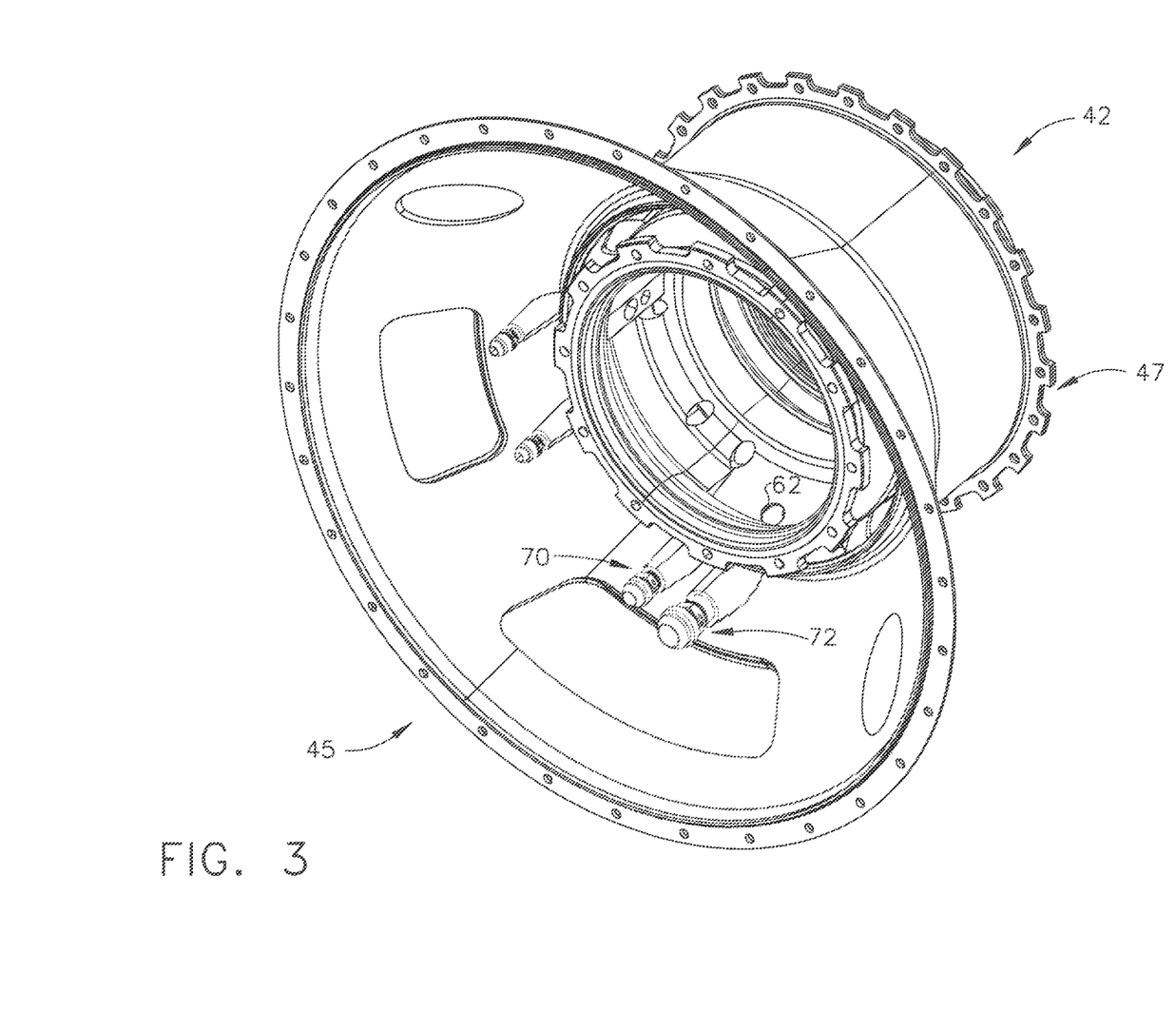
FIG. 3 is a perspective view of the low pressure turbine sump housing assembly.

Referring now to FIG. 3, the sump assembly 42 is shown in perspective view. The assembly 42 includes a first or forward end 45 and a second or aft end 47. The core components, such as the multi-stage turbine, pass through the hollow interior of the assembly 42 and the sump 48 located therein. Shown within the assembly 42 is drain apertures 62 which provide flow communication with fitting 70. Fitting 72 is in flow communication with the scavenge system that circulates oil to the sump 48. Fitting 70 is in flow communication with the drain 62 previously described and is utilized in situations wherein the oil sump seal 50 is leaking, during overflow or failure condition. The fitting 70 allows oil to drain to atmosphere 65 as depicted in FIG. 2 during conditions wherein the drain 62 is in operation.

Figure 4:
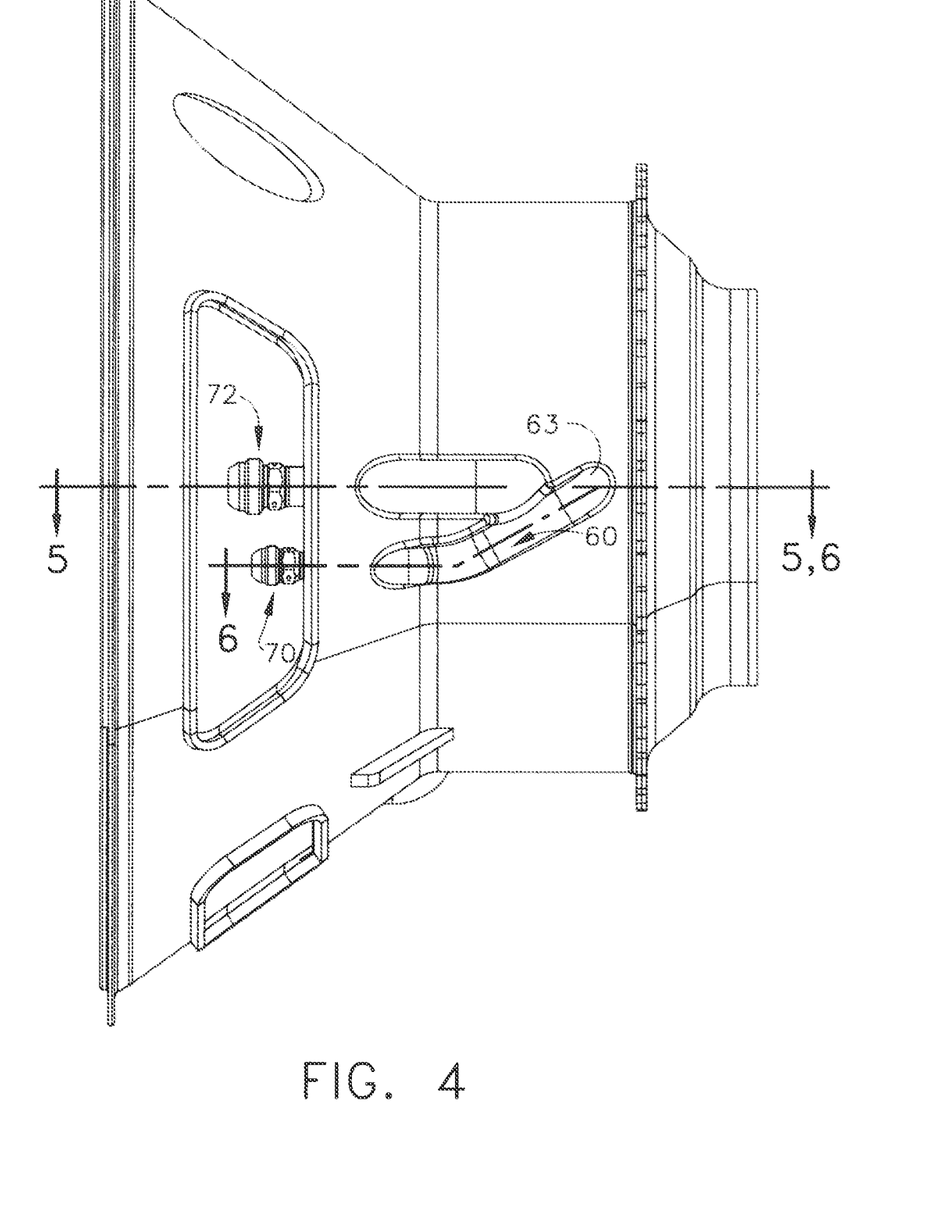
FIG. 4 is a bottom view of the low pressure turbine sump housing assembly.

Referring to FIG. 4, a bottom view of the sump assembly 42 is shown. The passage 60 is depicted along with the downstream drain passage 63 leading to the fitting 70. This view depicts the horizontal length of oil passage or pathway downstream of the drain 62. In a horizontal attitude or a nose down attitude, the oil will flow through the passage 60 by gravity feed in the failure or overflow condition at oil seal assembly 50 (FIG. 2). However, in a nose up condition the oil passing through the oil seal assembly 50 cannot drain by way of gravity feed. This is because the passageway 63 extends a vertical distance upwardly, in nose up condition, before draining to atmosphere. In this orientation, gravity feed is not possible.

Figure 5:
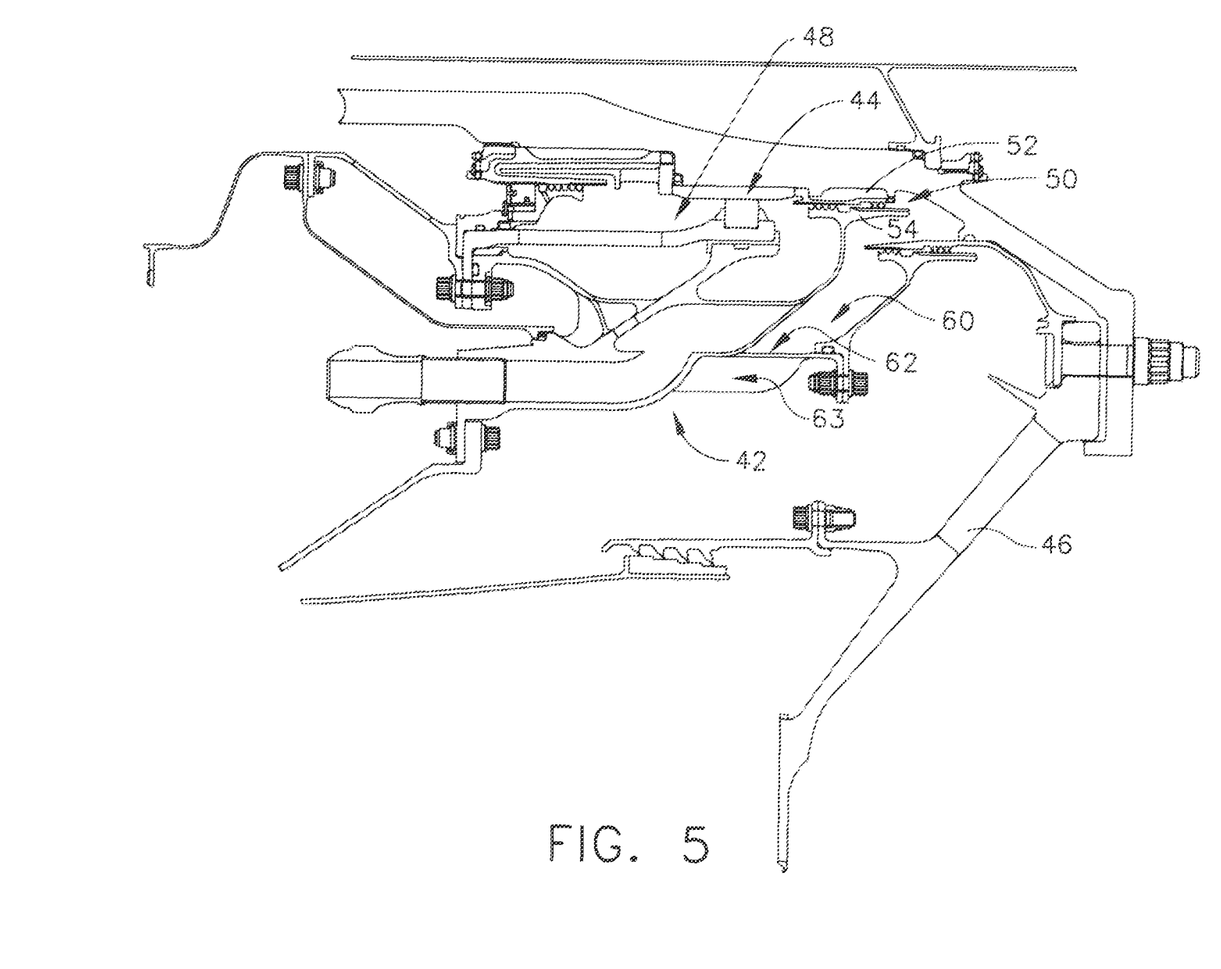
FIG. 5 is a side section view of the low pressure turbine sump housing assembly oil scavenge.

Referring now to FIG. 5, a detailed section view of the aft bearing sump 48 and related portions of the sump assembly 42 are depicted. The bearing 44 is shown within the sump 48 and allows for rotation of a rotational seal 52 as well as the low pressure shaft 46 and related components such as the low pressure discs 32 (FIG. 2) and connected airfoils 36. The oil seal assembly 50 retains oil disposed within the sump 48 inhibiting the oil from moving into the passage 60 way during normal operating conditions. However, during operation, one of the failure paths of the sump seal 50 is between the rotating seal portion 52 and the stationary seal portion 54. Accordingly, in failure conditions, the oil seal 50 may allow oil to escape into the passage 60. A drain 62 is located at a lower position of the passage 60. The passage 63 turns axially forward as shown in FIGS. 3 and 4 to extend to a fitting 70 toward the forward end of the assembly 42. In the section view taken of FIG. 5, a drain for the sump is also shown for the scavenge line 72 (FIG. 3), which is the primary means for circulation of oil from the oil sump 48.

Figure 6:
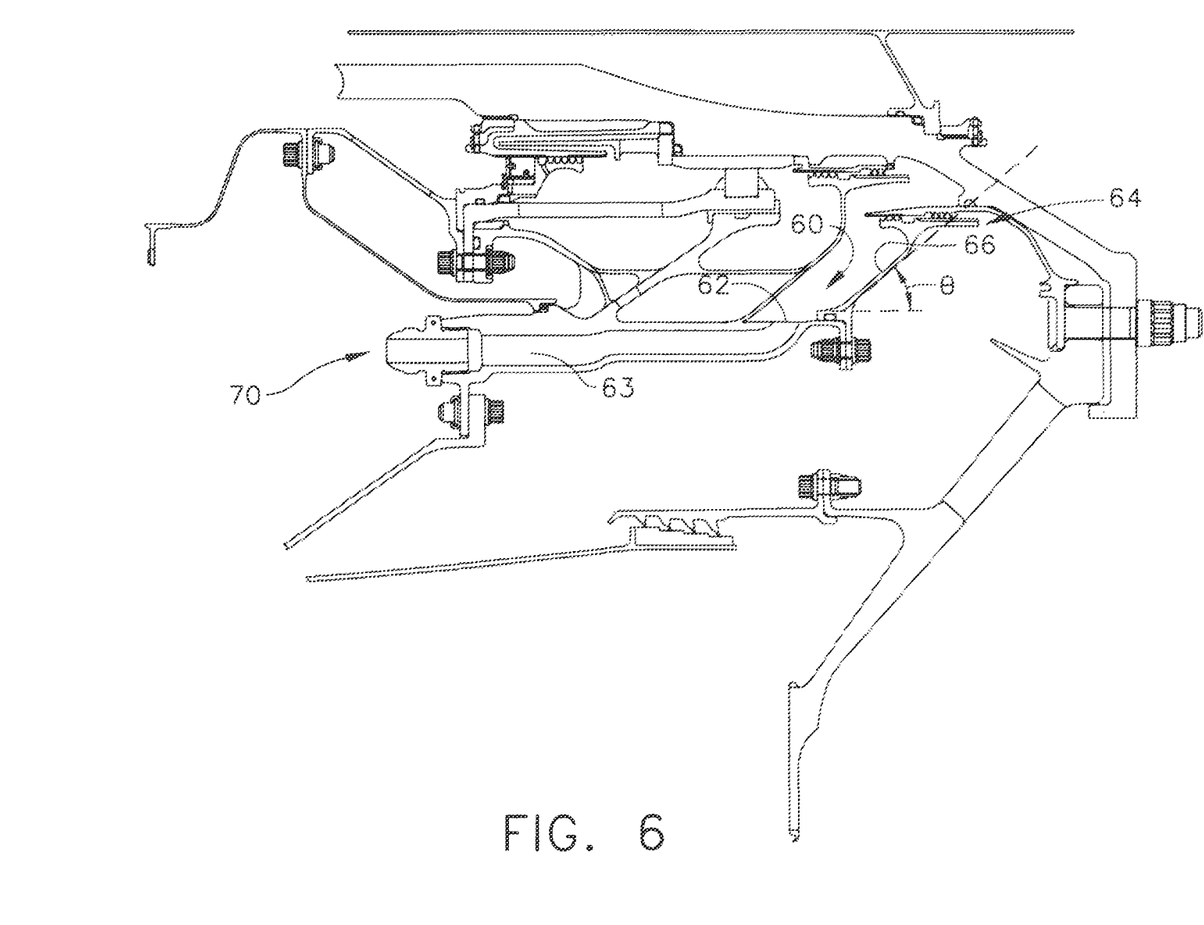
FIG. 6 is a side section view of the low pressure turbine sump housing assembly drain.

Referring now to FIG. 6, the assembly 42 is shown again in a section view taken through the passage 60 so that the fitting 72 and associated scavenge components are removed. The passage is formed by a wall 66 and extends at an angle θ. According to the design of the instant embodiments, the angle of the wall is at least about 30° and may be about 40°, for example. This angle is defined by an extreme attitude position for testing of the engine 10. Extreme attitude position is a nose-up angle of the axial center line of the engine axis 26. At this nose-up extreme attitude angle or position, the wall 66 is no less than horizontal incline. Additionally, at this position the drain 62 is still disposed vertically beneath the feature 64. The passage 63 also may be a constant cross sectional area. In a failure condition, oil will leak past the oil seal 50. Failure conditions may occur when the scavenge system failure causes overflow of the seal assembly 50 or the seal 50 fails allowing passage of oil into the drain passage 60. The oil then moves past the feature 64, for example air seal depicted, and to the drain 62. Beyond the drain 62, the passage 63 turns horizontally forward within the sump assembly 42. However, in the extreme attitude angle or condition, the passage 63 turns vertically upward and the oil cannot gravity feed to atmosphere.

Figure 7:
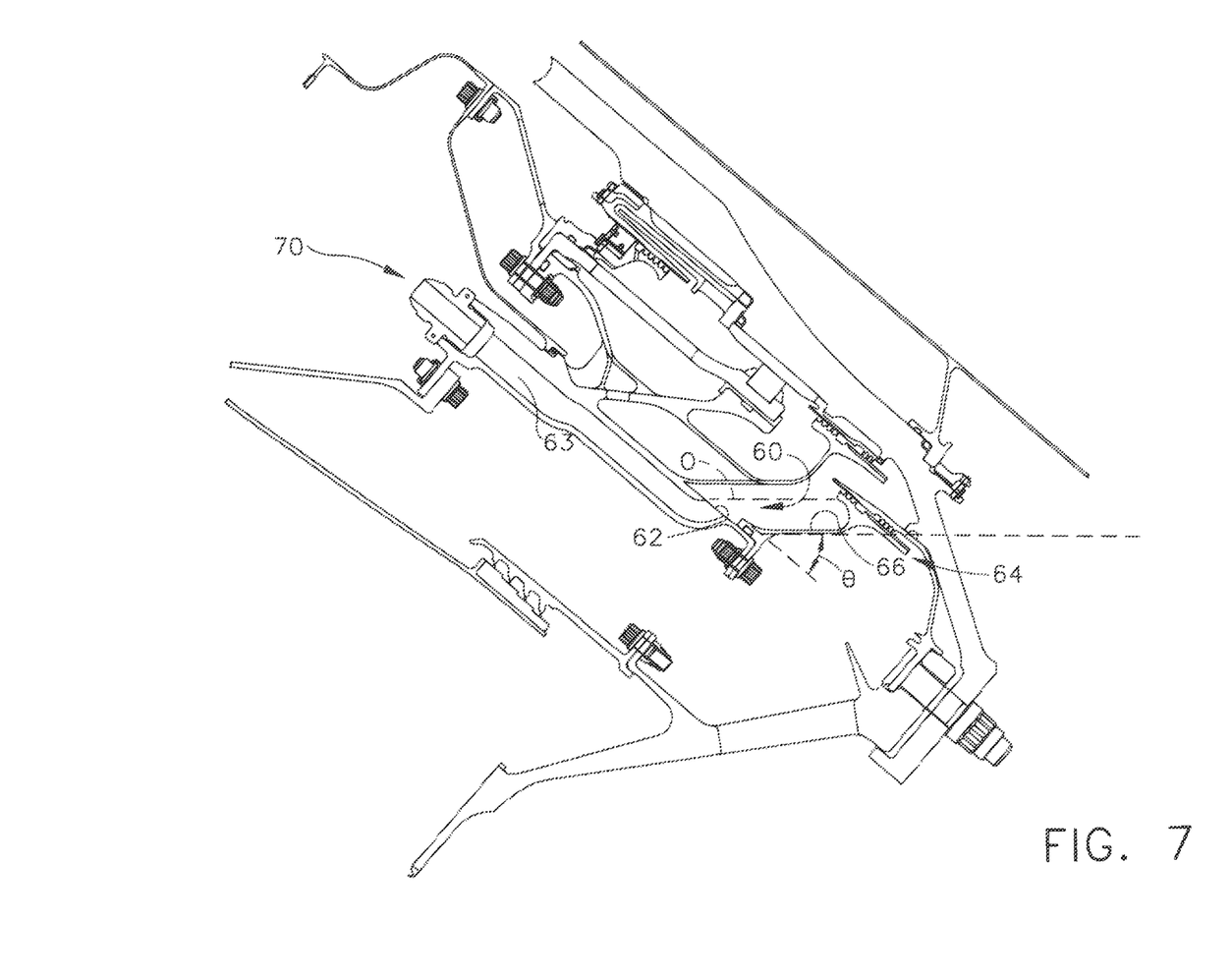
FIG. 7 is a side view of the low pressure turbine sump housing drain in a nose-up attitude condition.

As shown in FIG. 7, the engine is rotated to an extreme attitude condition. In such extreme nose-up attitude, the oil must pass through the passage 60, through the drain 62 and through the passage 63 which is extending vertically upward some amount. In order to utilize the pressure differential between the passage 60 and atmosphere, the drain 62 and subsequent passage 63 must not allow air to pass by or else the oil will not be forced upwardly through passage 63 during extreme nose-up attitude. The oil must pool in an area above the drain 62 and fully cover the drain so that air pressure does not bypass the oil and move out through the passage 60 downstream of the drain 62. The oil is generally depicted by horizontal line O near the drain 62. Accordingly, the geometry of the passage 60 is designed so that at the extreme attitude angle or position, oil completely covers the drain 62. When this occurs, air pressure within the passage 60 forces oil through the drain 62 and upwardly through the downstream passage 63 to the fitting 70. The pressure differential between the cooling air and the passage 60 and atmosphere 64 forces oil out of the passage 63 to the atmosphere. The design, however, requires and maintains that the oil fully covers the drain aperture 62.

Additionally, the feature 64 is located vertically above the drain aperture 62 in the extreme attitude angle or position. The feature, for example seal, not only performs its primary function but also aids to inhibit oil from flowing backward away from the drain 62. Such back flow of oil would also preclude submergence of the drain 62. The submergence of the drain provides that the air pressure can force the oil through the passage 63 and against gravity. This also aids in pooling of oil to cover the drain 62 allowing pressure to force oil upwardly through passage 60 and out to atmosphere.

Figure 8:
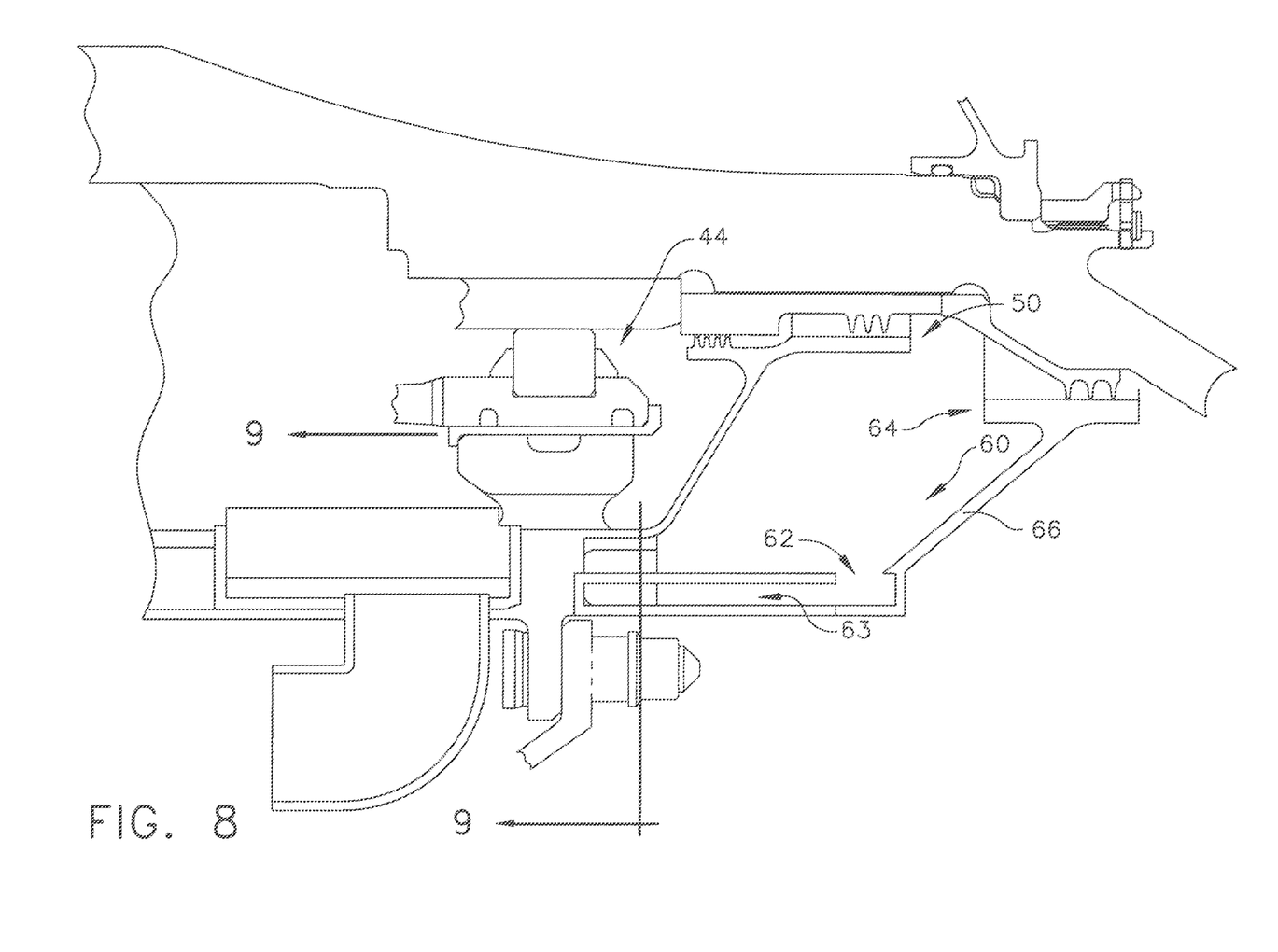
FIG. 8 is a side view of the an alternate embodiment of the low pressure turbine sump drain; and, FIG. 9 is an aft looking forward view of the low pressure turbine sump drain of FIG. 8.

Referring now to FIG. 8, a section view of the bearing sump is depicted. The view provides an improved depiction of the passage 60 along wall 66 and the feed of oil through drain 62. In failure or overflow condition, the oil moves through the passage 60 and pools around or submerges drain 62 when the engine 10 is at the extreme attitude angle. Still, however, the feature 64 aids to create pooling and is above the drain 62 in the extreme condition. When the drain 62 is submerged, the oil is forced to move upwardly through drain passage 63. However, as shown in FIG. 8 the oil moves through passage 63 and this passage is directed upwardly in the extreme attitude condition.

Figure 9:
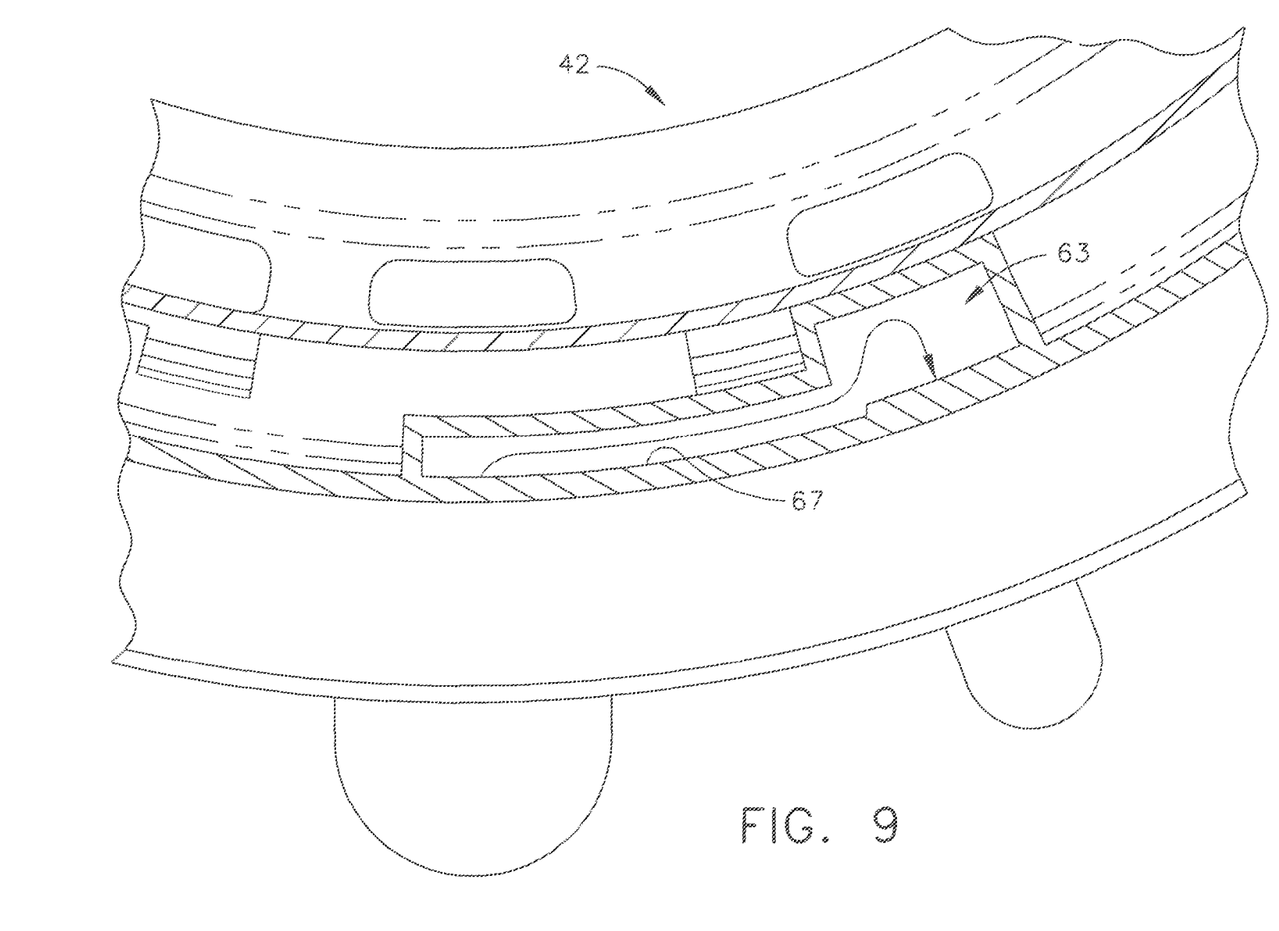

Referring now to FIG. 9, a section view of the assembly 42 is shown aft looking forward. The view depicts the movement of oil circumferentially through the assembly 42. A channel 67 extends through the assembly 42 defining a portion of downstream passage 63. The channel provides for movement of oil toward the fitting 70 (FIG. 3).

According to some embodiments, a pressure fed oil drain for a gas turbine engine comprising an oil sump for a shaft bearing, a passage in flow communication with the oil sump, the passage for use in failure conditions, a pressure differential between the passage and atmospheric conditions, a drain disposed near a lower position of the passage, a wall adjacent the drain being disposed at a preselected angle which is equal to or greater than an extreme attitude angle of an engine centerline. The pressure fed oil drain may further comprise a feature upstream of the drain. The feature may be an air seal or an oil, for example. The feature may be disposed vertically above the drain at the extreme attitude angle. The passage receives overflow oil from the sump. The pressure fed oil drain wherein the drain location provides for formation of an oil pool to cover the drain. The oil pool allows the pressure differential to force oil upward in elevation. The pressure fed oil drain further comprises a drain passage downstream of the drain, wherein the drain passage is of substantially constant area.

According to other embodiments, a pressure fed oil drain for a gas turbine engine comprises an oil sump, at least one seal retaining oil in the oil sump, a drain passage is in flow communication with the oil sump and at least one seal, the passage being pressurized, a drain located at a lower position of the drain passage, a passage wall adjacent to the drain creating a pool of oil during seal failure, a geometry of said drain and passage at an extreme attitude position causing the pressure to force oil from the drain upwardly through the passage downstream of the drain. The pressure fed oil drain wherein the passage wall is disposed at an angle of equal to or greater than an extreme attitude angle. The pressure fed oil drain wherein the extreme attitude position being at least thirty (30°) degrees. The pressure fed oil drain wherein the drain is disposed vertically beneath a passage feature at the extreme attitude position. The pressure fed oil drain further comprises a pool of the oil fully covering the drain. The pressure fed oil drain wherein pressure forces the oil through the drain. The pressure fed oil drain wherein the feature extends from a passage wall. The pressure fed oil drain wherein the feature is an oil seal or an air seal. The pressure fed oil drain wherein the feature is disposed above the drain at an extreme attitude condition.

According to still other embodiments, a pressure fed oil drain for gas turbine engine comprises an oil sump and a passage in selective flow communication with the oil sump, an oil seal positioned at one end of the sump, the passage in flow communication with a drain, the passage being pressurized and creating a differential between the passage and ambient atmosphere, the drain disposed at an elevation beneath a passage feature when the turbine engine is disposed at an extreme attitude angle, the passage extending upwardly when in the extreme attitude angle.

The foregoing description of structures and methods has been presented for purposes of illustration. It is not intended to be exhaustive or to limit the invention to the precise steps and/or forms disclosed, and obviously many modifications and variations are possible in light of the above teaching. Features described herein may be combined in any combination. Steps of a method described herein may be performed in any sequence that is physically possible. It is understood that while certain forms of oil drains have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A pressure fed oil drain for a gas turbine engine, comprising:
    an oil sump for a shaft bearing;
    a downstream passage extending substantially parallel to an engine centerline;
    a drain in flow communication with the downstream passage;
    a wall adjacent the drain, the wall extending away from the downstream passage at a preselected angle between thirty degrees and forty degrees, the wall forming a part of a passage in flow communication with the oil sump;

a feature extending from the wall in a direction substantially parallel to the engine centerline and into the passage beyond a location of the drain; and wherein the drain is disposed near a lower position of said passage, the drain, wall, and feature combining to provide for formation of an oil pool to cover the drain when the engine centerline is in an extreme attitude angle.

2. The pressure fed oil drain of claim 1, wherein the feature is positioned upstream of said drain.

3. The pressure fed oil drain of claim 1, said feature being an air seal.

4. The pressure fed oil drain of claim 1, said feature being an oil seal.

5. The pressure fed oil drain of claim 1, said feature inhibiting back flow of oil during a failure or overflow condition.

6. The pressure fed oil drain of claim 1, said feature being disposed vertically higher than said drain at said extreme attitude angle.

7. The pressure fed oil drain of claim 1, wherein said drain is disposed vertically lower than said feature at said extreme attitude position.

8. The pressure fed oil drain of claim 1, said extreme attitude position being at least thirty (30°) degrees.

9. The pressure fed oil drain of claim 1, said passage receiving overflow oil from said oil sump.

10. The pressure fed oil drain of claim 1, said oil pool allowing a pressure differential between the passage and atmospheric conditions to force oil upward in elevation.

11. The pressure fed oil drain of claim 1, wherein the downstream passage has a substantially constant cross-sectional area.

12. The pressure fed oil drain of claim 11, further comprising a fitting in flow communication with said downstream drain passage.

13. The pressure fed oil drain of claim 10, said oil pool causing said pressure differential to force oil from said drain upwardly through said downstream passage of said drain when in said extreme attitude angle.

14. The pressure fed oil drain of claim 1, said oil pool submerging said drain.

15. A pressure fed oil drain for gas turbine engine, comprising:

an oil sump and a passage in selective flow communication with said oil sump;

a drain disposed near a lower position of the passage and in flow communication with a downstream passage extending substantially parallel to an engine centerline;

a wall forming a part of the passage, the wall disposed adjacent to the drain and extending away from the downstream passage at a preselected angle between thirty and forty degrees;

a feature extending from the wall in a direction substantially parallel to the engine centerline and into the passage upstream of and beyond a location of the drain; and wherein when the engine centerline is in an extreme attitude angle, the drain is positioned at an elevation beneath the feature, the drain and wall provide for formation of an oil pool to cover the drain, and the downstream passage extends upwardly.

16. The pressure fed oil drain of claim 15, said feature being a seal.

* * * * *